Figure 1:
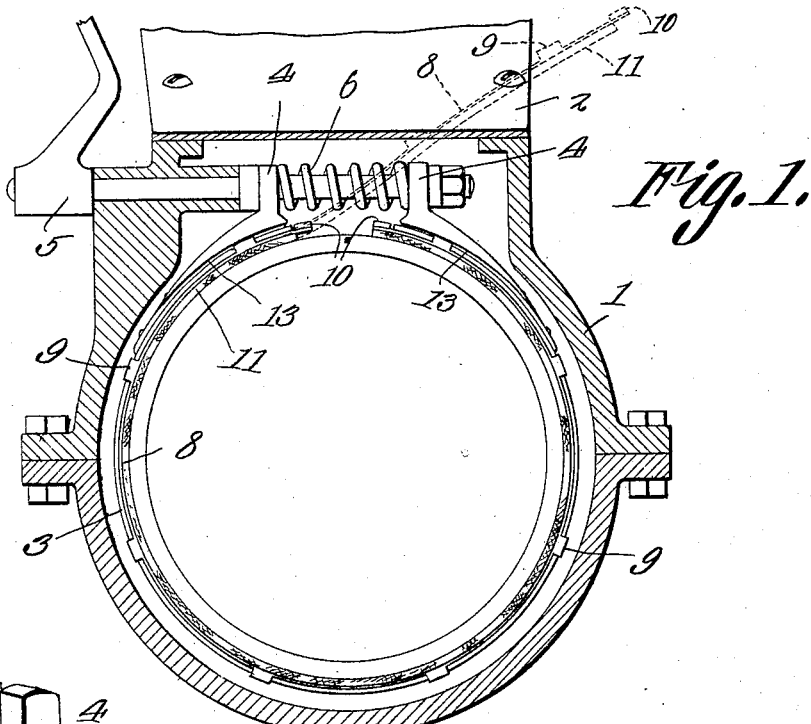

C. D. COLLEY.
REMOVABLE LINING FOR FRICTION BANDS.
APPLICATION FILED DEC. 9, 1915.

1,189,541.

Patented July 4, 1916.

C. D. Colley
Inventor, by C. A. Snow & Co.
Attorneys.

Witnesses

UNITED STATES PATENT OFFICE.

CLAYTON D. COLLEY, OF NARROWS, VIRGINIA.

REMOVABLE LINING FOR FRICTION-BANDS.

1,189,541. Specification of Letters Patent. Patented July 4, 1916.

Application filed December 9, 1915. Serial No. 65,980.

*To all whom it may concern:*

Be it known that I, CLAYTON D. COLLEY, a citizen of the United States, residing at Narrows, in the county of Giles and State of Virginia, have invented a new and useful Removable Lining for Friction-Bands, of which the following is a specification.

This invention relates to bands of that type used, for example, in connection with the transmission of the well known "Ford" automobile, although it is to be understood that the same can be used in connection with other types of machines, if desired.

In the machine of the particular type mentioned the brake band, slow speed band and reverse band are all located within a transmission housing on which a cover plate is detachably secured. The linings of the bands are riveted in position and can only be removed, after wear, by disconnecting a number of the parts of the mechanism and its housing, this procedure involving an undesirable expense due to the time and labor consumed.

One of the objects of the present invention is to provide a lining which can be placed on and removed from the band without disconnecting any of the parts except the top or cover plate of the transmission housing, and the connection between the lugs.

A further object is to provide a lining which is adapted to be slipped longitudinally onto or off of the band and which has means combined with it whereby the lining becomes locked to the band so as to be held against longitudinal displacement relative thereto while in use.

A further object is to provide means whereby the rivets or other fastening means employed for attaching the fabric of the lining to its backing are free to press outwardly or radially while the band is in use, so as not to dig into the drum surrounded by the band, the band being so constructed as to eliminate any possibility of these fastening devices becoming hung and interfering with the removal of the lining.

Another object is to provide a removable lining which does not require the use of a band having grooves therein tending to weaken the structure.

A further object is to provide a brake band and lining which can be as cheaply manufactured as the corresponding parts generally used and which can be readily substituted for said corresponding parts.

With the foregoing and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed, without departing from the spirit of the invention.

In the accompanying drawing the preferred form of the invention has been shown.

Figure 2:
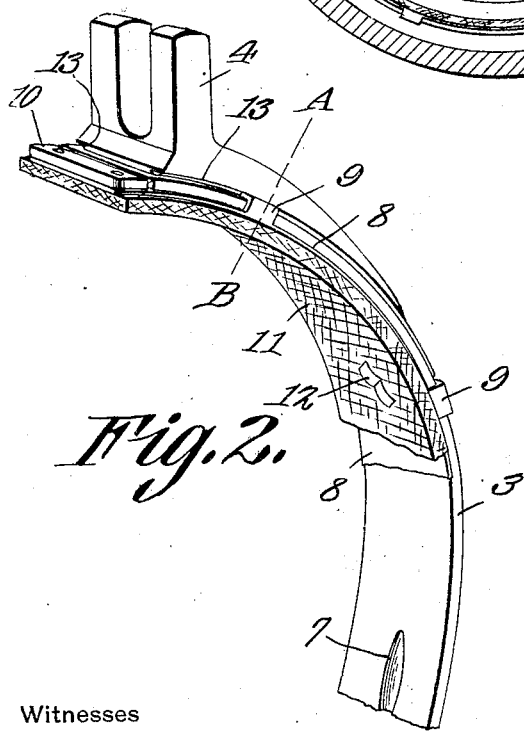
Figure 3:
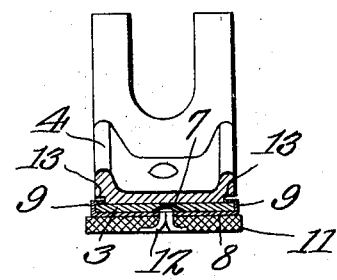

In said drawing: Figure 1 is a transverse section through a transmission casing and showing therein a band embodying the present improvement, the position of the lining while being inserted or removed being indicated by dotted lines. Fig. 2 is a perspective view of one end portion of the band and of a portion of the lining therein. Fig. 3 is a transverse section through the band and lining, said section being on the line A—B Fig. 2.

Referring to the figures by characters of reference 1 designates the transmission housing having the usual cover plate 2 removably secured thereon. In this housing is arranged a band 3 provided, at each end, with a forked lug 4, these lugs being engaged by the band actuating means indicated generally at 5, a spring 6 being arranged as ordinarily between the lugs. The band 3 is provided at intervals with elongated recesses 7 gradually increasing in depth from their ends toward their centers, these recesses being provided for the purpose hereinafter set forth.

The lining used in connection with the band consists of a metal strip 8 having angular ears 9 at the edges thereof and extending inwardly toward each other. Arranged upon the ends of this strip are stop cleats 10. A strip of fabric 11 is extended along the inner surface of the strip 8 and is held thereto by split rivets 12 or in any other suitable manner, the heads of the rivets being adapted, when the two strips 8 and 11 are assembled to lie loosely within the recesses 7. The fabric strip 11 is somewhat wider than the backing strip 8 and said backing strip is approximately of the same width as the band 3, said band being adapted to extend between the opposed ears. When the lining is in position upon the band, the stop cleats 10 will abut against the ends of the band so as to hold the lining against longitudinal displacement relative to the band. The ends of the ears 9 extend any desired distances across the outer face of the band and in order that they may be slipped readily onto and off of the band, side grooves 13 are preferably formed in the cleats 4 as shown particularly in Figs. 2 and 3.

When it is desired to apply the lining to a band within the housing 1 the cover plate 2 is removed and one end of a lining constructed in accordance with the present invention is inserted downwardly through the opening in the housing 1 and placed with the first pair of ears 9 in engagement with the opposed edges of the band. The lining is then thrust longitudinally so that the ears will be brought successively into engagement with the band and will slide along the opposed edges thereof until the cleat 10 at one end of the lining comes against one end of the band 3, at which time the other cleat will spring outwardly and engage the other end of the band. Thus the lining will be held against longitudinal movement relative to the band. When the band is applied to the drum surrounded thereby the rivets 12 will be pressed outwardly, and as the heads of the rivets are arranged within the recesses 7, this outward movement of the rivets will not be hindered. Thus the inner end portions of the rivets will not tend to dig into and mutilate the drum.

When it is desired to remove the lining the cleat 10 at one end thereof is depressed and pushed back under the adjacent end of the band 3 after which the other end of the band is grasped and pulled outwardly through the opening in the housing 1. This will cause the lining to slide longitudinally along the band until it is completely removed therefrom after which a new lining can be inserted in the manner hereinbefore pointed out. By providing the recesses or depressions 7 of gradually increasing depth toward their centers, there is no danger of the heads of the rivets becoming hung upon the walls of the recesses during the withdrawal of the lining.

It is to be understood that a lining such as herein described can be used in connection with each of the bands provided in the transmission housing and as one of these linings can be removed and another substituted without requiring the services of a skilled mechanic it will be obvious that a considerable saving can be effected by the use thereof. It will be seen that the lining is so constructed that either end thereof can be inserted first into position on the band.

Having thus described the invention, what is claimed is:—

1. The combination with a friction band, and lugs outstanding therefrom and having side grooves, of a lining slidable longitudinally into and out of engagement with the band, said lining including side ears slidable within the grooves and along the edges of the band, said ears constituting means for holding the lining to the band.

2. The combination with a friction band, and lugs outstanding therefrom and having side grooves, of a lining slidable longitudinally into and out of engagement with the band, said lining including side ears slidable within the grooves and along the edges of the band, said ears constituting means for holding the lining to the band, and means upon the ends of the lining and coöperating with the ends of the band to hold the lining against longitudinal displacement.

3. The combination with a friction band having spaced depressions of varying depth, of a lining including a flexible backing strip, means on said strip for slidably engaging the edges of the band to hold the strip to the band, a fabric strip upon the inner face of the backing strip, fastening means extending through said strip and shiftable outwardly into the depressions, and means upon the ends of the backing strip and coöperating with the band for holding the lining against longitudinal displacement relative to the band.

4. The combination with a housing having an opening and a friction band within the housing, of a lining insertible through the opening and longitudinally along the inner surface of the band, said lining including means at the sides thereof for slidably engaging the edges of the band to hold the lining to the band, and means upon the ends thereof for engaging the ends of the band to hold the lining against longitudinal displacement relative to the band.

In testimony that I claim the foregoing as my own, I have hereto affixed my signature in the presence of two witnesses.

CLAYTON D. COLLEY.

Witnesses:
HELEN ZIMMERMAN,
PHILOMENA A. ROCKELLI.